United States Patent
Lin et al.

(10) Patent No.: US 7,684,345 B2
(45) Date of Patent: Mar. 23, 2010

(54) METHOD FOR MONITORING UPSTREAM BURST PERFORMANCE IN A POINT TO MULTI-POINT ACCESS NETWORK

(75) Inventors: Huafeng Lin, Shenzhen (CN); Jun Zhao, Shenzhen (CN); Wei Huang, Shenzhen (CN)

(73) Assignee: Huawei Technology Co., Ltd., Shenzhen (CN)

( * ) Notice: Subject to any disclaimer, the term of this patent is extended or adjusted under 35 U.S.C. 154(b) by 549 days.

(21) Appl. No.: 11/612,611

(22) Filed: Dec. 19, 2006

(65) Prior Publication Data
US 2007/0237091 A1    Oct. 11, 2007

(30) Foreign Application Priority Data
Apr. 10, 2006    (CN) .................... 2006 1 0073013
Jul. 6, 2006    (CN) .................... 2006 1 0098548

(51) Int. Cl.
*H04L 12/26* (2006.01)
(52) U.S. Cl. ........................................ 370/252
(58) Field of Classification Search ................. 370/252
See application file for complete search history.

(56) References Cited

U.S. PATENT DOCUMENTS

| | | | |
|---|---|---|---|
| 6,647,210 B1 * | 11/2003 | Toyoda et al. | 398/102 |
| 6,693,921 B1 * | 2/2004 | Whitfield | 370/516 |
| 6,694,455 B1 * | 2/2004 | Scrandis et al. | 714/31 |
| 6,950,447 B2 * | 9/2005 | Dieterich et al. | 370/516 |
| 2004/0196862 A1 * | 10/2004 | Song et al. | 370/442 |

FOREIGN PATENT DOCUMENTS

| | | |
|---|---|---|
| CN | 1522077 A | 8/2004 |
| CN | 1571416 A | 1/2005 |
| CN | 1614944 A | 5/2005 |

OTHER PUBLICATIONS

Foreign Communication From a Related Counterpart Application—International Search Report and Written Opinion, PCT/CN2007/001152, Jul. 19, 2007, 8 pages.

* cited by examiner

*Primary Examiner*—Huy D Vu
*Assistant Examiner*—Stephen J Clawson
(74) *Attorney, Agent, or Firm*—Conley Rose, P.C.; Grant Rodolph (57) ABSTRACT

The present disclosure is related to a method for monitoring upstream burst performance in a point to multi-point access network. The method comprises: determining the expected time of the upstream data burst from the current terminal end (TE) reaching the head end (HE) using the timeslot assigned to the current TE, monitoring the actual time of the upstream data burst from the current TE reaching the HE, calculating and saving the difference between the expected time and the actual time of the upstream data burst from the current TE reaching the HE; calculating and outputting whether the difference is equal to or exceeds the TE's performance index value for the predetermined monitoring terms. The method provided by the present disclosure may monitor upstream burst performance of the entire network and discover the TEs with potential malfunctions, to effectively improve the network's stability.

9 Claims, 5 Drawing Sheets

METHOD FOR MONITORING UPSTREAM BURST PERFORMANCE IN A POINT TO MULTI-POINT ACCESS NETWORK

CROSS-REFERENCE TO RELATED APPLICATIONS

This application is claiming priority of Chinese Application Number 200610073013.7 filed Apr. 10, 2006 and Chinese Application Number 200610098548.X filed Jul. 6, 2006, both of which are entitled "A Method for Monitoring Upstream Burst Performance in a Point to Multi-Point Access Network" and are incorporated herein by reference in their entirety.

BACKGROUND

The present disclosure is related to the field of access networks, particularly to a method for monitoring upstream burst performance in a point to multi-point (P2MP) access network.

Figure 1:
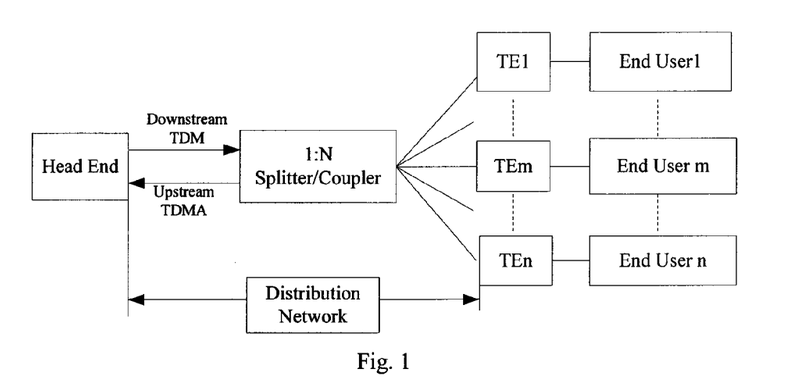
FIG. 1 illustrates one embodiment of a network topology construction for a point to multi-point access network.

Presently, there are access networks that broadcast downstream traffic using Time Division Multiple Access (TDMA) and use bandwidth sharing for upstream traffic, e.g. Broadband Passive Optical Network (BPON), Ethernet Passive Optical Network (EPON), and Gigabit Passive Optical Network (GPON). These networks have a point-to-point structure and comprise a Head End (HE), a distribution network, a Terminal End (TE), and an End User Device, where the HE may be an Optical Line Terminal (OLT), the TE may be an Optical Network Terminal (ONT), and the End User Device may be a Personal Computer (PC). From the HE to the TE is the downstream direction, and from the TE to the HE is the upstream direction. Referring to the network topology shown in FIG. 1, the HE sends downstream traffic to the TE and the End User Device via a splitter/coupler in the distribution network using a Time Division Multiplex (TDM) broadcast, while the TE sends upstream traffic to the HE using TDMA. Depending on the specific situation, the distribution network may not be limited to the single-level embodiment illustrated in FIG. 1.

Figure 2:
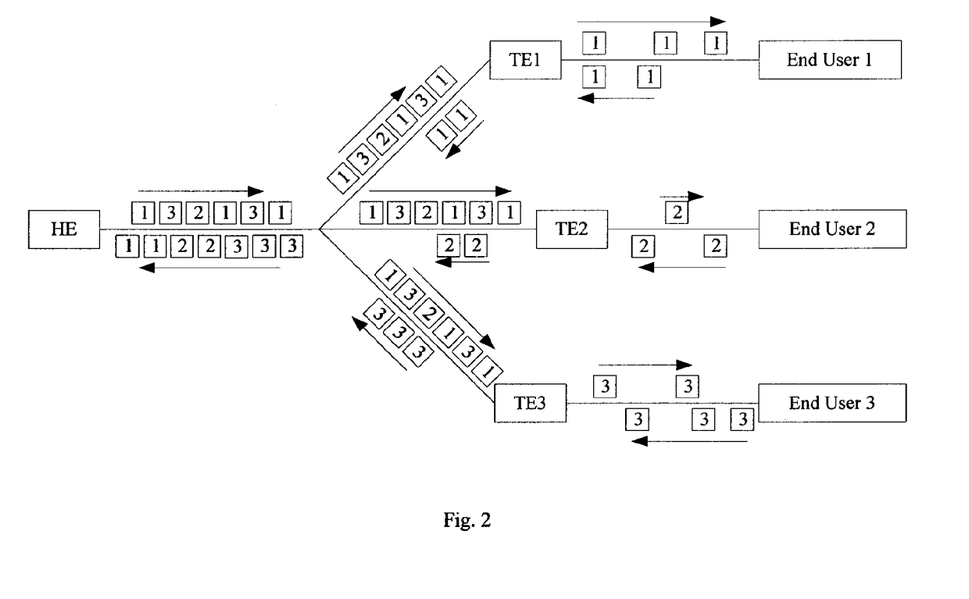
FIG. 2 is one embodiment of a TDMA schematic diagram for upstream bandwidth sharing in a point to multi-point network.

One of the key technologies in the network is the TDMA technology that is used for upstream bandwidth sharing, the working principle of which is illustrated in FIG. 2. Generally, the HE first measures the distance from the HE to each TE, makes the logical distance to each TE the same by compensating for each TE's time delay, and then uniformly manages and allocates upstream bandwidth using Dynamic Bandwidth Attribution (DBA) technology. Each TE sends its upstream data burst in the timeslot authorized by the HE, so that upstream collisions are effectively avoided. In FIG. 2, the numbers 1, 2, and 3 in the boxes represent data belonging to the TEs 1, 2, and 3 respectively, which includes downstream data from the HE to the TE as well as upstream data from the TE to the HE. When the HE sends downstream data 1, 3, 2, 1, 3, and 1 through the distribution network (not shown in FIG. 2) to the TEs, TE1 picks out its own data, 1, from the received downstream data and discards the other data. Similarly, TE2 and TE3 pick out their own data, 2 and 3 respectively, and discard the other data. For upstream data, the TEs send their data to the HE according to the timeslots authorized by the HE. For example, TE1 sends data 1 according to the HE's authorization, TE2 sends data 2 according to the HE's authorization, and TE3 sends data 3 according to the HE's authorization. Because the data sent from the TEs are sent in the timeslots authorized by the HE, the upstream data from TE1, TE2, and TE3 arrives in order at the HE, collision of upstream data is avoided, and the HE correctly receives the upstream data.

However, there are risks for a network working under this principle. For example, one of the TEs may have an uncontrollable exception, which may be due to the TE's hardware and/or software failing or hackers maliciously operating the TE. The TE with the exception may not send upstream data according to the HE's authorization, may not send any upstream data, may continuously send upstream data bursts, or may send upstream data bursts in unauthorized timeslots. Here, the TE with the exception is called a Rogue TE. When the rogue TE does not send upstream data bursts, some of the upstream bandwidth is wasted, but the normal operation of the entire network is unaffected. When the rogue TE continuously sends upstream data bursts, it causes upstream data burst collisions in the HE receiver, such that the data signals overlap. When this occurs, the HE will not be able to receive the upstream data from the TEs, and the whole network's upstream channel jams.

Figure 3:
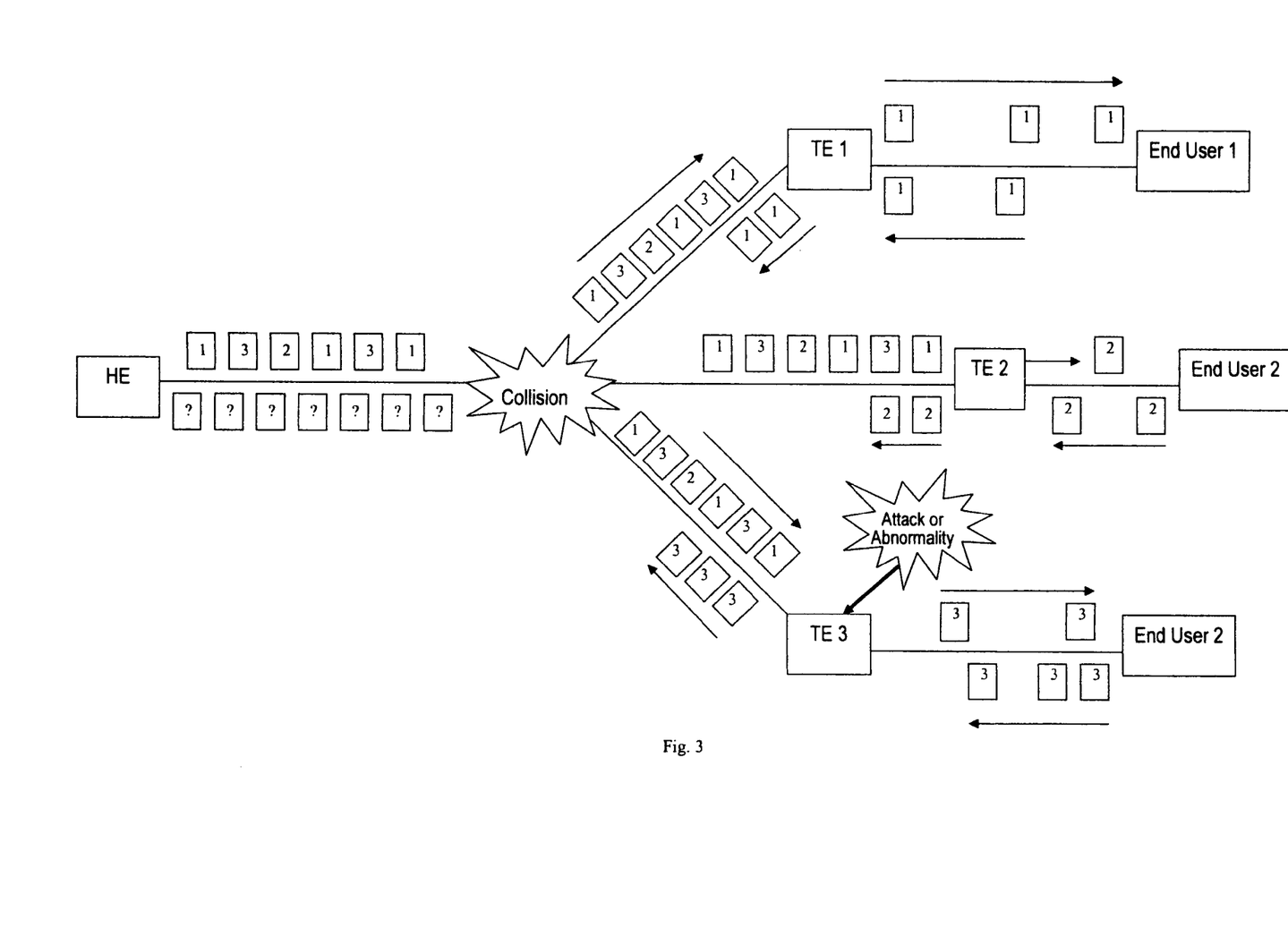
FIG. 3 depicts one embodiment of the state of a rogue TE appearing in a point to multi-point access network.

Referring to FIG. 3, when TE3 is controlled by a hacker or has a hardware or software failure, it does not send upstream data in the designated timeslots but continuously sends upstream data. Data sent by TE3 in the unauthorized timeslots collides with data sent from the other TEs and prevents the HE from correctly receiving upstream data from the TEs. The question marks in FIG. 3 represent unrecoverable data signals caused by upstream data burst collisions.

SUMMARY

Accordingly, the present disclosure provides a method for monitoring upstream burst performance in a point to multi-point access network, which may include monitoring the upstream burst performance status of the whole network and guarding against rogue TEs. The method comprises:

In an embodiment, the disclosure includes a method for monitoring the upstream burst performance of a point-to-multipoint access network, comprising:

A. estimating, based on a dynamic bandwidth allocation, a time when an upstream data burst from a current terminal should arrive at a head end; monitoring the time when the upstream data burst from the current terminal actually arrives at the head end; computing and storing the difference between the estimated arrival time and the actual arrival time for the upstream data burst from the current terminal;

B. determining whether the predetermined monitoring condition is met and, if so, proceeding to Step C; otherwise, returning to Step A; and C. computing and outputting an upstream burst performance indicator value for the current terminal based on the difference obtained.

In another embodiment, the disclosure includes a method for monitoring the upstream burst performance of a point-to-multipoint access network wherein an ID value is set for each terminal end (TE) in the access network to indicate whether the TE is under separate monitoring and both of a difference threshold and a performance indicator threshold are set, wherein the method comprises:

A. estimating, based on a dynamic bandwidth allocation, a time when an upstream data burst from a current TE arrives at a head end (HE); monitoring the time when the upstream data burst from the current TE actually arrives at the HE; computing and storing the difference between the estimated arrival time and actual arrival time for the upstream data burst from the current TE;

B. determining the ID value of each TE in the access network, and if the TE is a TE not under separate monitoring, determining whether the difference is greater than or equal to the predetermined difference threshold and, if so, setting the ID value to the value that indicates the TE is under separate monitoring and proceeding to Step C, and if not, returning to Step A; if the TE is a TE under separate monitoring, proceeding to Step C; and C. storing the difference for TEs under separate monitoring until a predetermined monitoring condition is met and placing the ID value of the TEs that meet the predetermined monitoring condition to the value indicating not under separate monitoring, computing an upstream burst performance indicator value based on the stored difference, and determining whether the computed upstream burst performance indicator value is greater than or equals to the performance indicator threshold, and if so, sending an alarm; if not, returning to Step A.

In a third embodiment, the disclosure includes a method for monitoring the upstream burst performance of a point-to-multipoint access network wherein the difference threshold is set and which comprises:

A. a head end (HE) estimating, based on the timeslot assigned to a terminal end (TE) in the access network, the time when the upstream data burst from the TE should arrive at the HE; monitoring the time when the upstream data burst actually arrives at the HE; determining the difference between the estimated arrival time and actual arrival time for the upstream data burst from the TE; and B. determining whether the differences for the predetermined number of consecutive times are all greater than the difference threshold, and if so, sending an alarm; otherwise, returning to Step A.

Obviously, the method for monitoring upstream burst performance in a point to multi-point network provided by the present disclosure has the following benefits:

1. The present disclosure performs a statistical analysis of the difference between the expected time and the actual time that the upstream data burst reaches the HE, is aware of upstream burst performance of the whole network in real-time, and provides information for the network administrator's decision-making.

2. Although it is possible to monitor the whole network's status by monitoring the bit error rate, there are obviously upstream data burst collisions in the network when the bit error rate increases. Instead, the present disclosure uses the time that the upstream data burst reaches the HE, which is simple, easy to implement, and more timely and accurate than other methods, such as monitoring the bit error rate.

3. The present disclosure may discover a TE with a potential failure in real-time by monitoring the upstream data burst arrival time, thereby improving the network's stability.

DETAILED DESCRIPTION

As described in the background, the method for taking action after a rogue TE appears in an access network is relatively passive. Accordingly, the present disclosure provides a method for monitoring the upstream burst performance of all of the TEs in an access network. The principal idea comprises: monitoring the difference between the expected time and the actual time that the TE's upstream data burst reaches the HE and statistically analyzing the difference, thereby monitoring upstream burst performance of the TE and alarming of a rogue TE.

Embodiment One

Figure 4:
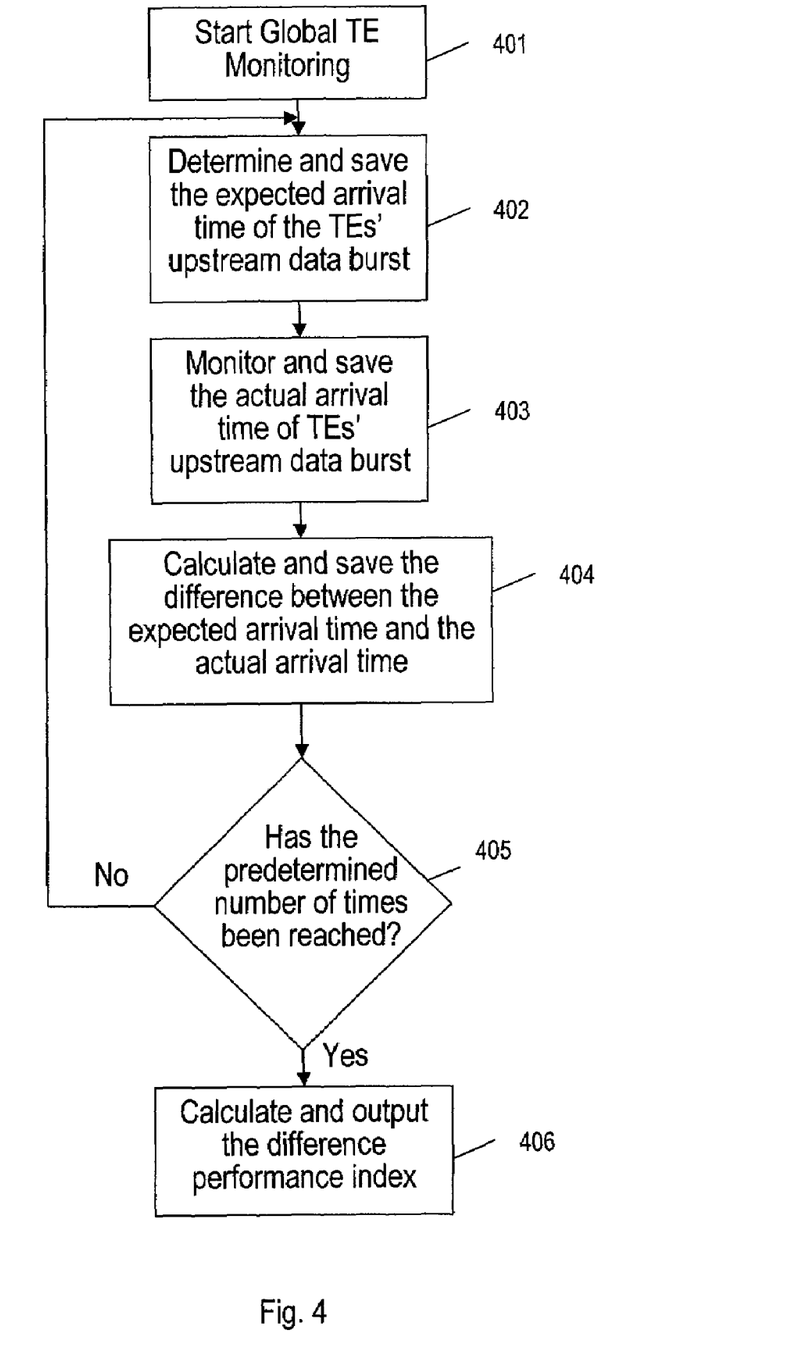
FIG. 4 is a flowchart illustrating a method for monitoring all of the TEs according to an embodiment of the present disclosure.

FIG. 4 is the flowchart for monitoring all of the TEs according to a first embodiment of the present disclosure. Using, for example, an access network containing thirty-two TEs and using 8,000 monitoring results for each of the thirty-two TEs, the detailed procedure and steps are as follows:

Step 401, start global TE monitoring. The start of the global TE monitoring may be triggered by a specific order that is set. When starting the global TE monitoring, the monitoring terms are set beforehand, where one of the monitoring terms may be the quantity of monitoring data. For example, a user may define the quantity of monitoring data for each TE at 8,000, so that the difference between the expected time and the actual time of the TEs' upstream data burst reaching the HE are collected 256,000 times (8,000 samples for each of the 32 TEs). Otherwise, the monitoring term may be the time period for monitoring the TEs, i.e. collect all of the differences of the TEs' upstream data burst reaching the HE over a predetermined time period.

Step 402, determine and save the expected upstream data burst arrival time for every TE. In a point to multi-point access network, the HE first measures the distance from the HE to each TE, makes the logical distance to each TE the same by compensating for each TE's time delay, and then allocates upstream transmission authorizations to the TEs, i.e. assigns timeslot ranges for the TEs to send upstream data bursts. There are various methods for assigning timeslot ranges, such as Dynamic Bandwidth Attribution (DBA), Static Bandwidth Attribution (SBA), and so forth. Regardless of how the timeslot ranges assigned by the HE for the TE, the timeslot range starting point is the expected time that the front of the upstream data burst sent by the TE reaches the HE, while the timeslot range end point is the expected time that the end of the upstream data burst sent by the TE reaches the HE. Therefore, the HE may determine the expected upstream data burst arrival time for each TE according to the upstream sending authorization allocated to each TE, and save the thirty-two upstream data burst arrival times as variables $T_1 \ldots, T_i, \ldots, T_{32}$, among which $T_i$ represents the expected upstream data burst arrival time for TE number i. Note that there may be at least one unauthorized TE in a certain authorization frame that the HE sends to the TEs, wherein the expected and actual arrival time of the unauthorized TE should both be zero.

Step 403, monitor and save the TEs' actual upstream data burst arrival time. When the TEs send upstream data bursts to the HE, the HE receives the upstream data bursts, records the actual times that the thirty-two TEs' data bursts reach the HE, and saves the actual time as variables $t_1 \ldots, t_i, \ldots, t_{32}$, where $t_i$ represents the actual upstream data burst arrival time for TE number i.

Step 404, calculate and save the difference between the TEs' expected and actual upstream data burst arrival time. Calculate the difference ($T_i-t_i$) between the expected arrival time, Ti, and the actual arrival time, $t_i$, for the TEs' upstream data burst, and save the difference as $\Delta t_i$, where i is from one to 32. In real practice, i is the number of TEs that currently collect statistics. The above steps obtain the time difference between the TEs' upstream data bursts that reach the HE.

Step 405, determine whether the quantity of obtained differences reaches the predetermined monitoring count. If the predetermined monitoring count is reached, return to step 402, otherwise, then go to step 406. A one-time abnormality in the difference, $\Delta t_i$, does not imply that TE number i is abnormal or aggressive, so it is necessary to obtain the $\Delta t_i$ statistics N times. Here, N is set as 8,000, so this step determines whether $\Delta t_i$ has been saved 8,000 times. If $\Delta t_i$ has not been saved 8,000 times, return to step 402 until $\Delta t_i$ has been collected and saved 8,000 times. If $\Delta t_i$ has been saved 8,000 times, go to the next step.

Step 406, calculate and output the upstream burst performance index. The upstream burst performance index may reflect the performance status of the TEs sending upstream data bursts. For example, if the TEs are experiencing bad clock jitter, the mean squared error of N differences will be large. Therefore, the obtained upstream burst performance index for the TEs may be used to evaluate the performance of the TEs sending upstream data bursts, and consequently may be used to monitor the upstream burst performance. The method for calculating the upstream burst performance index may be mathematical statistics, i.e. taking mathematical statistics of the predetermined number of differences, which has physical meaning, e.g. calculating the difference's mean, mean squared error, or root mean square. Here, use the mathematical statistical analysis for the 8,000 differences of each TE, e.g. calculate the mean or the mean squared error, etc. The statistical analysis of the 8,000 differences may be a good reflection of the quality of the upstream data bursts reaching the HE. In other words, the statistical analysis may reflect the performance of the TEs sending upstream data bursts. Furthermore, for the TEs having worse upstream burst performance, e.g., when the mean squared error is relatively large, the system administrator may carry out further, separate monitoring of the upstream burst performance for those TEs, if desired. When necessary, other monitoring technology may be used to assist this process, e.g. monitoring the light power, the bit error rate, etc., or the administrator may take action to dispose of the TEs apt to be rogue TEs.

The process and method for monitoring several TEs with worse upstream burst performance are similar to the method for monitoring global TEs in the present embodiment, which may be called the specific TE monitoring method. The difference is that global TE monitoring is monitoring all of the TEs in a network, whilst specific TE monitoring is performing the monitoring and statistical analysis on at least one of the TEs N number of times.

Regardless, before proceeding to the steps described above, conditions to trigger the alarm may be predetermined, e.g. a set threshold of statistical analysis results. After obtaining the output of the statistical analysis result, the result of each TE may be further compared with a result threshold, may be used to trigger an alarm event, or may be used to notify a network administrator when some statistical analysis result for the TE is greater than the result threshold.

The steps above describe a process for globally monitoring upstream burst performance of the TEs in an access network. Obviously, the embodiment of the present disclosure collects the time that the TEs' upstream data burst reaches the HE, obtains a master global upstream burst performance of the whole network by comparing the difference between the expected upstream data burst arrival time and the actual upstream data burst arrival time for the TEs, provides information for the network administrator's decision-making, and discovers the TEs with potential failures in real-time, thereby improving the network's stability and ability to resist attack.

Embodiment Two

A method for automatic TE monitoring and early warning, which is similar to the method for global TE monitoring, is described below. Both methods first obtain the time differences for the TEs' upstream data bursts reaching the HE, and then analyze the obtained differences. The distinction is that the method for global TE monitoring may be started by a specific command, while the method for automatic TE monitoring and early warning may be triggered by a power-on or a reset of the HE. The HE monitors, in real time, the time difference between each of the HE's dynamic bandwidth allocations and the TEs' upstream data burst related to the bandwidth allocation. For each time, it compares the collected differences of all of the TEs with the predetermined threshold. If at least one of the TEs' upstream data burst differences are equal to or exceed the difference threshold, separate monitoring of that TE is automatically triggered. If the statistics result of N separate monitorings still exceeds the result threshold, the alarm event is automatically triggered, and the network administrator is notified.

Figure 5:
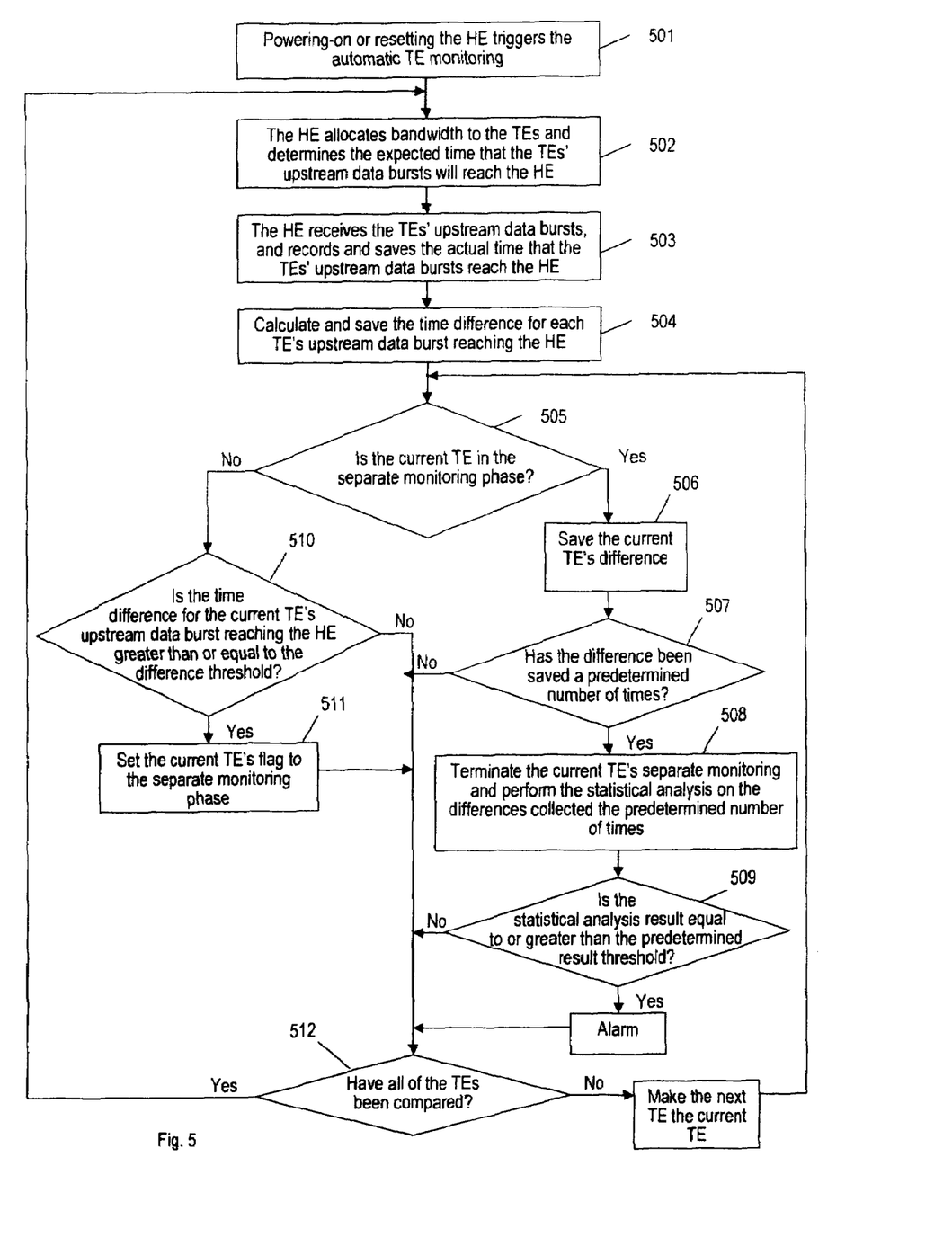
FIG. 5 is a flowchart illustrating a method for automatic TE monitoring and alarming according to a second embodiment of the present disclosure.

In the present example, there are thirty-two separate TEs in the access network, the TE monitoring time, N, is set at 1,000, and the difference threshold, $T_{con}$, and result threshold may be predetermined according to the specific situation or protocol. The early-warning mechanism automatically monitors the differences for the separate TEs related to each dynamic bandwidth allocation in real time. If at least one of the TE's differences are equal to or exceed the difference threshold, $T_{con}$, triggers a separate monitoring of that TE for 1,000 times, and performs the statistical analysis on the 1,000 differences. If the result is equal to or exceeds the result threshold, an alarm will be automatically sent to a network management module or Element Management System (EMS). Otherwise, it presumes that the TEs are normal, terminates the current specific TE separate monitoring process, returns to the dynamic bandwidth allocation, and automatically starts the next TE monitoring, thereby building up the automatic TE monitoring and early-warning mechanism for the whole network. Referring to FIG. 5, a flowchart of the automatic TE monitoring and early-warning method according to the second embodiment of the present disclosure, the process comprises:

Step 501, powering-on or resetting of the HE triggers the automatic monitoring. At this time, none of the TEs are being separately monitored. Specifically, an identifier flag, [m], may be set to zero to represent that TE number m is not in the separate monitoring phase of the present embodiment. On the contrary, if flag[m]=1, it means that TE number m is in the separate monitoring phase. Regardless, the difference threshold, $T_{con}$, and the result threshold both are initialized to a predetermined default value and certainly may be modified through commands.

Step 502, the HE allocates bandwidth for the TEs, determines and saves the expected time of each TE's upstream data burst reaching the HE. The expected time of TE's upstream data burst reaching the HE is saved as variable T[m], which represents the expected time of the upstream data burst for TE number m reaching the HE.

Step 503, the HE receives the upstream data burst from the TEs and records the actual time that each TE's upstream data burst reaches the HE. The actual time that the TE's upstream data burst reaches the HE is saved as variable t[m], which represents the actual time of the upstream data burst for TE number m reaching the HE.

Step 504, calculate and save the time difference for each TE's upstream data burst reaching the HE, and save the difference (T[m]−t[m]) as variable Δt[m], which represents the time difference for TE number m's upstream data burst for reaching the HE.

Step 505, determine whether the current TE is in the separate monitoring phase. If the current TE is in the separate monitoring phase, go to step 506, otherwise, go to step 510. Because the identifier flag is used to represent whether the TE is in the separate monitoring phase in the present embodiment, it only needs to determine whether the current TE's flag is one. If so, go to step 506, otherwise, go to step 510.

Step 506, save the current TE's difference.

Step 507, determine whether the differences have been saved the predetermined number of times already. If the differences have been saved N times already, go to step 508, otherwise, go to step 512. Here, the predetermined number of times is 1,000, so the differences need to be collected 1,000 times in order to calculate the current TE's upstream burst performance.

Step 508, terminate separate monitoring of the current TE, and perform statistical analysis on the differences collected the predetermined number of times. The separate monitoring of current TE is terminated by setting the current TE's flag to zero and calculating upstream burst performance index with the differences that were collected 1,000 times. Here, the statistical analysis is performed on the differences.

Step 509, determine whether the statistical analysis result is equal to or exceeds the predetermined result threshold. If the statistical analysis result is equal to or exceeds the predetermined result threshold, send out the alarm, otherwise, go to step 512. If the statistical analysis result is equal to or exceeds the result threshold, it means that the current TE may be abnormal and may possibly become a rogue TE. If this is the case, send an alarm to the system administrator or EMS in order to notify the system administrator or EMS to carry out further monitoring on the TE. Other assisting monitoring technologies may be used if necessary, e.g. monitoring the light power, the bit error rate, etc., or the system administrator may take corresponding action directly on the TE (e.g. terminate the TE's upstream transmissions). If the statistical analysis result is less than the predetermined result threshold, it may be determined that the current TE is normal, and go to step 512.

Step 510, determine whether the time difference for the current TE's upstream data burst reaching the HE is equal to or exceeds the difference threshold. If so, go to step 511, otherwise, go to step 512.

Step 511, set the current TE's flag to the separate monitoring phase. If the time difference for the current TE's upstream data burst reaching the HE is equal to or exceeds the difference threshold, then the TE has performed a dangerous upstream data burst transmission, which may be an indication of an upcoming abnormality. Thus, a separate specific monitoring needs to be performed on the TE in order to judge the appearance of the possible abnormality. Here, this is achieved by setting the corresponding flag to one.

Step 512, determine whether the comparison of the differences of all of the TEs is finished, if so, return to step 502. Otherwise, make the next TE the current TE, and return to step 505.

Below is an actual implementation of the present embodiment in a GPON network. The GPON standard, which is incorporated herein by reference, states that a Ranging Time Physical Layer Operations, Administration, and Maintenance (PLOAM) message is used to fine tune the Equalization-Delay (EqD) for each ONT. Therefore, it needs to calculate the time difference for each TE's ONT upstream data burst to the HE OLT. The present embodiment utilizes the difference out of the calculation, triggered by the guard time in the OLT burst time overhead allocation method as recommended by the standard. Namely, the difference threshold, $T_{con}$, performs a judgment and statistical analysis to obtain the whole network's upstream burst performance, and achieves monitoring of upstream burst performance of a certain specified TE. Table 1 provides the OLT burst time overhead allocation method (per G.984.2 appendix 1). In the present embodiment, the upstream data rate is 1,244.16 Megabits per second (Mbps), so half of the guard time, e.g. 16 bits, is chosen as the trigger. Similarly, ¾ of guard time may be chosen as the difference threshold, $T_{con}$, according to the particular network situation.

TABLE 1

| Upstream Data Rate (Mbps) | Guard Time (bit) |
|---|---|
| 155.52 | 6 |
| 622.08 | 16 |
| 1,244.16 | 32 |
| 2,488.32 | 64 |
| Note | Minimum |

First, set the difference threshold as 16, as well as the statistical analysis' result threshold. After that, monitor, in real time, the difference for the ONTs' upstream data burst in the network reaching the OLT, and compare the difference with the difference threshold 16. When a certain ONT's difference is equal to or exceeds 16, trigger the ONT's separate monitoring. Then, fine-tune the ONT's Equalization-Delay using the method for re-calculating and renewing the EqD as described in the GPON standard. The time difference for the ONT's upstream data burst calculated in the previous step is recorded and saved. The above fine-tuning and difference saving steps are repeated several times, and the statistics for these results are taken and compared with the predetermined result threshold. If the result is equal to or exceeds the threshold, the alarm is sent to the EMS, otherwise the ONT is normal, and nothing is done.

The above steps describe in detail a specific method for automatic monitoring and early warning. From this, it is easy to see that the present embodiment provides a method that may automatically monitor, in real time, the upstream burst performance for the whole network, and assist the system administrator to master the TEs' status to a great extent.

Embodiment Three

The third embodiment of the method for monitoring and early warning of the present disclosure is described below, and is similar to the first embodiment and the second embodiment. All three methods proceed with the time of the TE's upstream data burst reaching the HE, and monitor the difference between the TEs' upstream data bursts reaching the HE. The first embodiment collects the differences N times and performs the statistical analysis on the differences. The second embodiment collects, for N times, the differences for the TEs whose difference exceeds the predetermined difference threshold once, and performs statistical analysis on these differences. The third embodiment utilizes the difference threshold to send the alarm for those TEs that have differences that exceed the predetermined difference threshold N consecutive times.

Figure 6:
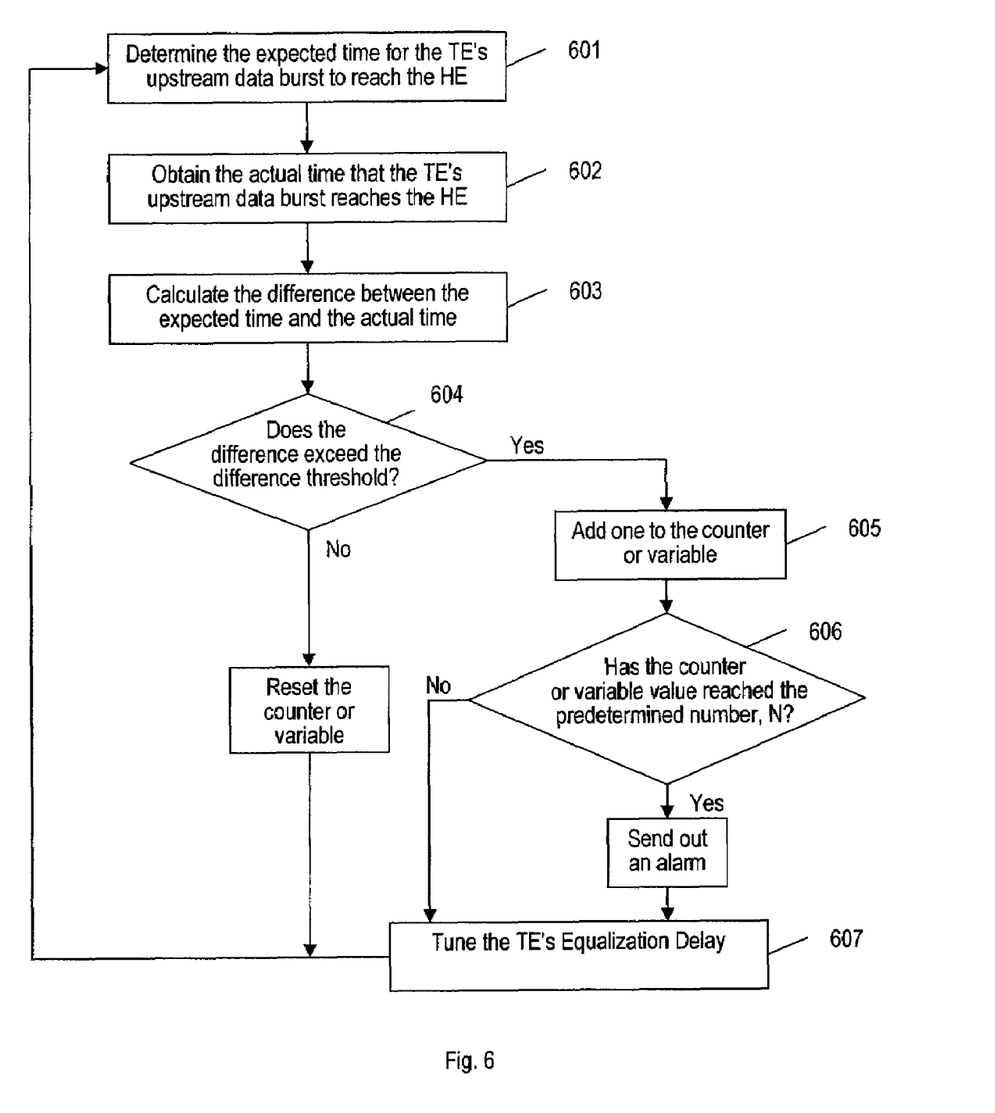
FIG. 6 is a flowchart illustrating a method for upstream burst performance monitoring and alarming according to a third embodiment of the present disclosure.

A GPON network may be used as an example. FIG. 6 is a flowchart illustrating the method for upstream burst performance monitoring and alarming according to the third embodiment of the present disclosure. In the present embodiment, the predetermined difference threshold and time, N, is set according to guard time and/or the particular network situation. In practice, a timer or a variable may be used to count the consecutive number of times, N, that the difference exceeds the difference threshold. In detail, the steps are:

Steps 601-603, the HE determines the TE's expected upstream data burst arrival time using the assigned timeslot ranges, receives the upstream data burst from the TE, obtains the actual upstream data burst arrival time, and calculates the difference between the TE's upstream data burst expected arrival time and the actual arrival time. Here, the TE may be all of the TEs in the access network, or a specific TE.

Step 604, determine whether the difference exceeds the predetermined difference threshold, and if so, execute steps 605-607. Otherwise, reset the counter or variable to zero and return to step 601. Thereafter, any time the difference is less than the difference threshold, the counter or variable will be reset to zero and count the consecutive number of times that the difference exceeds the difference threshold.

Steps 605-607, add one to the counter or variable used to count the consecutive number of times that the difference exceeds the difference threshold, and determine whether the value of the counter or variable reaches the predetermined number, N. If so, send out an alarm, reset the counter or variable to zero, tune the TE's EqD, and return to step 601. Otherwise, directly tune the TE's EqD and return to step 601. Thereafter, if a predetermined time is met, in other words, the difference has exceeded the difference threshold for N consecutive times, tuning the EqD several times will have proven to be useless. This means that the ONT's upstream data burst cannot get back into the normal range of differences, even after tuning the EqD, so the alarm needs to be sent out. The counter or variable is reset to zero while sending out the alarm. Here, an alarm may be sent to the network management module or EMS when the difference exceeds the difference threshold for N times.

The above three embodiments respectively describe methods for analyzing the difference between the expected arrival time and the actual arrival time of the TE's upstream burst data reaching the HE in a point to multi-point network, thereby monitoring the network's operational status and warning early of rogue TEs. The methods provided by the present disclosure may also be applicable to monitoring data performance in other types of networks.

The above-described embodiments are only the preferred embodiments of the present disclosure and should not be considered limitations for the present disclosure. Any modification, equivalent alteration, or improvement should be encompassed within the protection scope of the present disclosure if they fall within the spirit and scope of the present disclosure.

What is claimed is:

1. A method comprising:
    receiving a plurality of data bursts from a terminal end;
    calculating an estimated data burst arrival time for at least some of the data bursts;
    measuring an actual data burst arrival time for at least some of the data bursts;
    calculating a difference between the estimated data burst arrival time and the actual data burst arrival time;
    determining whether the difference is greater than or equal to a difference threshold;
    storing the difference for a predetermined quantity of the data bursts;
    calculating a burst performance indicator value using the predetermined quantity of differences;
    determining whether the burst performance indicator value is greater than or equal to a performance indicator threshold; and
    sending an alarm if the burst performance indicator value is greater than or equal to the performance indicator threshold,
    wherein the method is implemented in an optical line terminal (OLT) in a gigabit passive optical network (GPON), and the terminal end is an optical network terminal (ONT).

2. The method of claim 1 wherein the burst performance indicator value is a statistical value.

3. The method of claim 2 wherein the statistical value is a mean, a mean squared error, or a root mean square.

4. The method of claim 1 further comprising allocating an OLT burst time overhead using the difference.

5. A system comprising:
    a head end in communication with a terminal end,
    wherein the terminal end sends a plurality of data bursts to the head end, and
    wherein the head end implements a method comprising:
    estimating an upstream data burst arrival time for at least some of the data bursts,
    monitoring an upstream data burst arrival time for at least some of the data bursts,
    determining a difference between the estimated data burst arrival time and the actual data burst arrival time,
    determining whether a predetermined number of consecutive differences are equal to or greater than the difference threshold, and
    sending an alarm when the predetermined number of consecutive differences is equal to or greater than the difference threshold.

6. The system of claim 5 further comprising adjusting an equalization delay for the terminal end when the predetermined number of consecutive differences are equal to or greater than the difference threshold.

7. The system of claim 5 wherein the system is a gigabit passive optical network (GPON), the head end is an optical line terminal (OLT), and the terminal end is an optical network terminal (ONT).

8. The system of claim 7 wherein the method further comprises allocating an OLT burst time overhead using the difference.

9. The system of claim 7, wherein the estimated data burst arrival time is an expected time for a front end of the upstream data burst sent by the ONT to reach the OLT.

* * * * *